United States Patent
Utz (10) Patent No.: US 7,657,167 B2
(45) Date of Patent: Feb. 2, 2010

(54) COMPACT CAMERA MODULES WITH LAVET STEPPING-MOTORS AS ACTUATORS

(75) Inventor: Hubert Utz, Alling (DE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 335 days.

(21) Appl. No.: 11/527,296

(22) Filed: Sep. 26, 2006

(65) Prior Publication Data

US 2008/0075446 A1    Mar. 27, 2008

(30) Foreign Application Priority Data

Sep. 25, 2006    (EP)    .................................. 06368012

(51) Int. Cl.
*G03B 3/10*    (2006.01)
(52) U.S. Cl. .......................... 396/85; 396/133; 396/144
(58) Field of Classification Search ................. 396/133, 396/85–87, 144; 348/207.99, 294
See application file for complete search history.

(56) References Cited

U.S. PATENT DOCUMENTS

| | | | |
|---|---|---|---|
| 2,986,683 A | | 5/1961 | Lavet et al. |
| 3,324,780 A | * | 6/1967 | Miyauchi ..................... 359/696 |
| 3,667,210 A | | 6/1972 | Meitinger |
| 4,294,531 A | * | 10/1981 | Shenk ......................... 352/140 |
| 4,504,132 A | | 3/1985 | Martin et al. |
| 4,563,604 A | | 1/1986 | Xuan |
| 4,575,210 A | * | 3/1986 | Yamada et al. ............... 396/130 |
| 5,206,983 A | | 5/1993 | Guckel et al. |
| 5,349,574 A | | 9/1994 | Edwin et al. |
| 5,418,417 A | * | 5/1995 | Luthier et al. ........... 310/323.08 |
| 5,572,270 A | * | 11/1996 | Yamamoto et al. .......... 396/133 |
| 5,685,062 A | | 11/1997 | McCarthy et al. |

(Continued)

FOREIGN PATENT DOCUMENTS

FR    823395    1/1938

(Continued)

OTHER PUBLICATIONS

"Electric motor", [online] Feb. 20, 2007, XP-002421017, URL:http://en.wikipedia.org/wiki/Electric-motor#AC-motors>, pp. 1-19, Anonymous.

(Continued)

*Primary Examiner*—W. B. Perkey
(74) *Attorney, Agent, or Firm*—Saile Ackerman LLC; Stephen B. Ackerman (57) ABSTRACT

A horological motor of the Lavet motor concept is used to form an actuator to control movement of a lens system to reduce power consumption in digital camera units used in various electronic equipment, e.g. PDA's, mobile phones, digital still cameras and camcorders, and as a result increase battery life. The coils of the horological motor are driven with CMOS I/O signals eliminating the need for high current motor drivers and allowing the integration of all picture capture functions, including the light sensitive pixel array, into a single chip to form a system on chip implementation. A plurality of actuators is used to control a lens system comprising auto focus, zoom and shutter and iris functions. A gear transmission system is used to allow the motor of the actuator to move in micro step, which allows calibration of the motor against mechanical barriers.

15 Claims, 8 Drawing Sheets

U.S. PATENT DOCUMENTS

| | | | |
|---|---|---|---|
| 5,838,080 A | 11/1998 | Couderchon et al. | |
| 5,918,078 A | 6/1999 | Imura et al. | |
| 5,978,602 A | 11/1999 | Toyofuku et al. | |
| 6,072,955 A * | 6/2000 | Yokouchi et al. | 396/88 |
| 6,285,154 B1 * | 9/2001 | Yasuda et al. | 318/685 |
| 6,301,441 B1 | 10/2001 | Kato | |
| 6,430,368 B1 | 8/2002 | Hata | |
| 6,614,560 B1 * | 9/2003 | Silverbrook | 358/443 |
| 6,614,998 B1 | 9/2003 | Senba et al. | |
| 6,714,733 B2 * | 3/2004 | Kobayashi | 396/133 |
| 7,103,273 B2 * | 9/2006 | Hosokawa et al. | 396/133 |
| 7,112,932 B2 * | 9/2006 | Krenzke et al. | 318/400.3 |
| 7,203,011 B2 * | 4/2007 | Ito et al. | 359/811 |
| 7,212,358 B2 * | 5/2007 | Mattsson et al. | 359/824 |
| 7,356,252 B2 * | 4/2008 | Wang | 396/79 |
| 7,444,073 B2 * | 10/2008 | Lee | 396/72 |
| 2004/0189238 A1 * | 9/2004 | Kasahara et al. | 318/696 |
| 2006/0062559 A1 | 3/2006 | Naka et al. | |
| 2008/0075453 A1 * | 3/2008 | Utz | 396/452 |

FOREIGN PATENT DOCUMENTS

| | | |
|---|---|---|
| JP | 09274127 | 10/1997 |

OTHER PUBLICATIONS

"Shaded—pole synchronous motor", Aug. 7, 2006, XP-002421018, Anonymous.
URL:http://en.wikipedia.org/wiki/Shaded-pole-synchronous-motor>, pp. 1-2.
"Micromotor Based Film Permanent Magnets", by P. Meneroud et al, Actuator 2004, 9th Int'l Conf. on New Actuators, Jun. 12-16, 2004, Bremen, Germany, pp. 491-494.

* cited by examiner

COMPACT CAMERA MODULES WITH LAVET STEPPING-MOTORS AS ACTUATORS

BACKGROUND OF THE INVENTION

1. Field of Invention

The present invention relates to digital camera modules used in digital equipment and mobile phones, and in particular to low power consumption actuators to improve longevity of battery power.

2. Description of Related Art

Today there are various types of actuators used to perform auto focus (AF), zoom and camera shutter functions. In traditional digital still cameras (DSC) stepper motors are being used for actuator functions. These stepper motors require a relatively large current in the range of 100 mA to 200 mA that provide a drain on the operating life of the batteries used. To facilitate a long operation time, large batteries are used.

In FR 823395 (Lavet) a low energy stepper motor is directed to horological devices such as watches and clocks. U.S. Pat. No. 2,986,683 (Lavet) is directed to drive wheels particularly applicable to timing instruments. U.S. Pat. No. 3,667,210 (Meitinger) is directed to a horological instrument that includes an oscillator such as a balance wheel. The oscillator comprises a conductive ring that is induced with current by mutual induction from a fixed coil. In U.S. Pat. No. 4,504,132 (Martin et al.) a multifunction electromagnetic actuator is directed to controlling exposure and focus in a photographic camera. U.S. Pat. No. 4,563,604 (Xuam) is directed to an electromagnetic stepping motor comprising two rotors coupled to a common transmission wheel to permit decreased size or decreased energy consumption for horological applications.

U.S. Pat. No. 5,206,983 (Guckel et al.) is directed to a micromechanical device formed on a substrate using X-ray lithography process to form a rotating micromotor which is driven magnetically. In U.S. Pat. No. 5,349,574 (Edwin et al.) a horological movement is directed to a shaft guide where the guide is composed of three pieces sandwiched on one another to receive a control member. In U.S. Pat. No. 5,685,062 (McCarthy et al.) a method of fabrication is directed to a planar micro-motor suited for batch method of fabricating multiple planar stepper micro-motors from a single substrate wafer. U.S. Pat. No. 5,838,080 (Couderchon et al.) is directed to a stepper motor comprising a rotor, stator, a coil with a magnetic core in which the stator consists of a soft magnetic alloy.

U.S. Pat. No. 5,918,078 (Imura et al.) is directed to a lens driving device that includes an operation ring rotated by a motor for automatic focusing. In U.S. Pat. No. 6,301,441 (Kato) a lens driving device is directed to focusing the lens of a camera using an AF motor. In U.S. Pat. No. 6,430,368 (Hata) an auto-focus apparatus is directed to a focusing device that has a first mode of a fine step interval for AF evaluation and a second mode of a course step interval for obtaining a rough in-focus position. U.S. Pat. No. 6,614,998 (Senba et al.) is directed to an auto-focus device that determines a plurality of positions of a lens group for focusing on a plurality of subjects using an AF motor the lens group or the imaging surface of a CCD device. A paper, "Micromotor Based on Film Permanent Magnets", P. Meneroud et al., Actuator 2004, 9$^{th}$ International Conference on New Actuator, pp491-494, 14-16 Jun. 2004, Bremen, Germany; is directed to a design for a single step micro-motor where the rotor has been optimized to induce the greatest magnetic energy using film permanent magnets.

Figure 1:
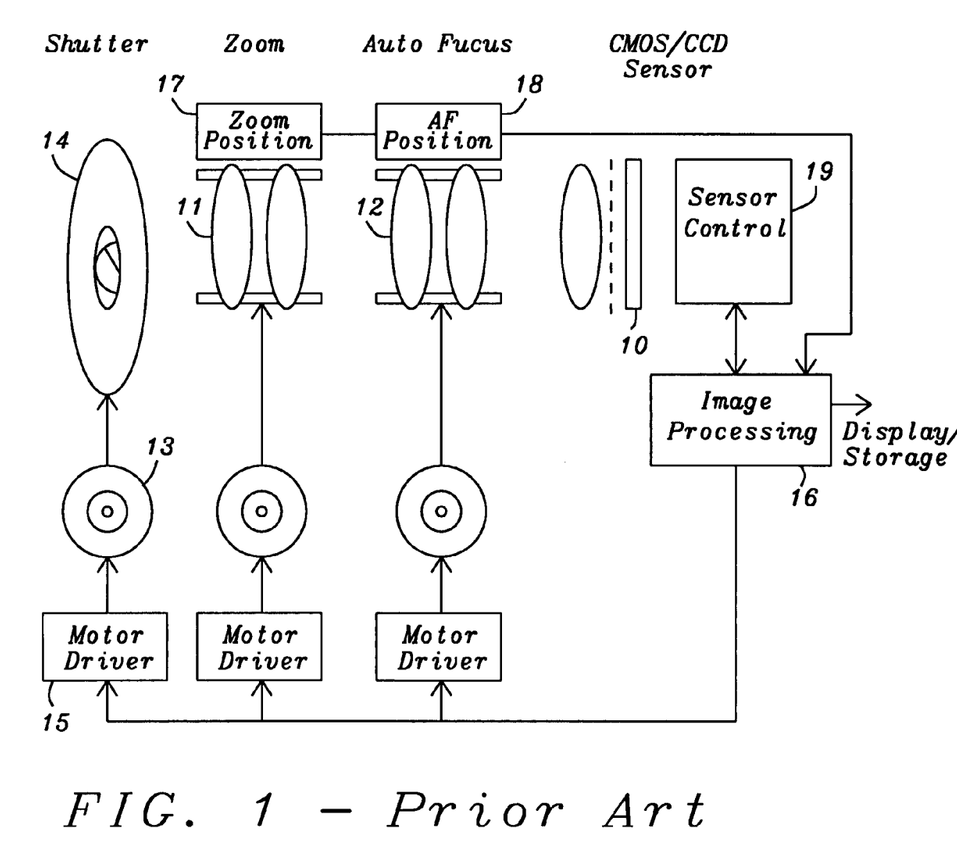
FIG. 1 is a schematic diagram of a digital camera unit of prior art.

FIG. 1 is a schematic diagram of a digital camera unit of prior art. An image is focused onto a CMOS/CCD imager sensing array 10 by a set of zoom lens 11 and auto focus lens 12. A set of motors 13 are used to actuate a shutter 14 and adjust the set of zoom lens 13 and the set of auto focus lens 12. The current requirement of the set of motors 13 necessitates the use of the motor driver circuits 15. The motor driver circuits are controlled by the image processing circuitry 16, which requires an input from zoom position 17, AF (auto focus) position 18 and sensor control 19 to control the movement of the motors 13 and provide a focused image onto the CMOS/CCD imager sensing array 10. The current requirement of the motors 13 provides a large drain on the power supply of the battery of the digital camera unit, and extra circuitry is required to provide position information of the zoom lens 11 and the auto focus lens 12.

In the mobile phone market, digital camera modules are being integrated into mobile phone handsets. This emerging new market of mobile phones comprising digital camera functions compete with low to midrange DCS market and challenges the capability of power consumption to provide an adequate battery life during operation, which in turn challenges low power consumption of the needed actuator elements.

In the watch industry precision, compact and low power actuators have been implemented using a Lavet motor concept. The Lavet type motors are capable of driving watch mechanisms with very low voltages and consuming very low current. This is a result of the Lavet style motors being active only when a step is performed, which leads to a very low power consumption resulting in battery life up to five years. Appling the Lavet concept to actuators in motorized camera modules produces lower power consumption along with a smaller size and simple electronic control, wherein the actuator power consumption is approximately fifteen times lower with approximately ten times lower current consumption at a one and a half times lower voltage. This leads to operating product containing digital cameras longer than product using conventional actuator and is particularly important to the mobile phone market.

SUMMARY OF THE INVENTION

It is an objective of the present invention to reduce power consumption for digital camera functions, comprising auto focus (AF), zoom and shutter control, and thereby increase battery life.

It is also an objective of the present invention to use a Lavet motor concept to control actuators of a digital camera function, thereby minimizing the power drain on batteries.

It is further an objective of the present invention to drive actuators with digital I/O signals allowing the integration of all electronic picture capture functions onto a single semiconductor chip including the necessary pixel array.

In the present invention a horological Lavet type motor concept is used to reduce power consumption by actuators for digital camera functions that form a part of portable digital assistant (PDA) and mobile phones as well as digital still cameras (DSC) and camcorders (CC). The Lavet motor concept has been used for years in watches drawing minuscule power from watch batteries in which the low current drain from the batteries occurs only when the Lavet motor is taking a step. In the present invention, the low current necessary to drive an actuator formed from the Lavet type motor concept allows the actuator to be driven directly with digital I/O signals, thereby allowing an integration of all picture capture functions, including the pixel array, into a single chip forming a system on chip (SOC) implementation.

In the actuator of the present invention a current position of the rotor of the Lavet type motor is held in position by a static torque, which allows the system to be handled and turned without loosing position of the actuator even when power is turned off. In other motor concepts without static torque either power must be maintained or a frictional force is required to keep track of the position of the actuator.

The actuator of the present invention uses a gear transmission that allows the motor of the actuator to move in micro steps creating changes in position of the actuator that are on the order of micrometers for each step. The micro steps allow the motor to operate against a mechanical barrier in order to calibrate the position of the motor. The gear transmission uses a 1/180 ratio such that no position sensors are required to perform zoom and AF functions. The mechanical construction of the actuator allows placing the actuator into miniaturized camera modules to support requirements of a mobile phone containing a digital camera function.

The actuators for zoom and AF are located on the same surface with a low profile of approximately 2.6 mm to allow usage in mobile phones. The supply voltage is between 2V and 3.3V where the maximum turn-on current is less than approximately 8 ma with the average current is approximately 5 ma. The actuators are designed to withstand an environmental shock of approximately 10.000 G from accidental dropping of the product within which they are mounted such as a mobile phone. This is accomplished by the addition of a clutch that releases the gears at a predefined force, which are used to control the position of the optical modules that control zoom and AF. After an environmental shock an algorithm repositions the actuators to a default position from which the image being created by a user can be re-established by the user.

BRIEF DESCRIPTION OF THE DRAWINGS

This invention will be described with reference to the accompanying drawings, wherein.

DETAILED DESCRIPTION OF THE PREFERRED EMBODIMENT

Figure 2A:
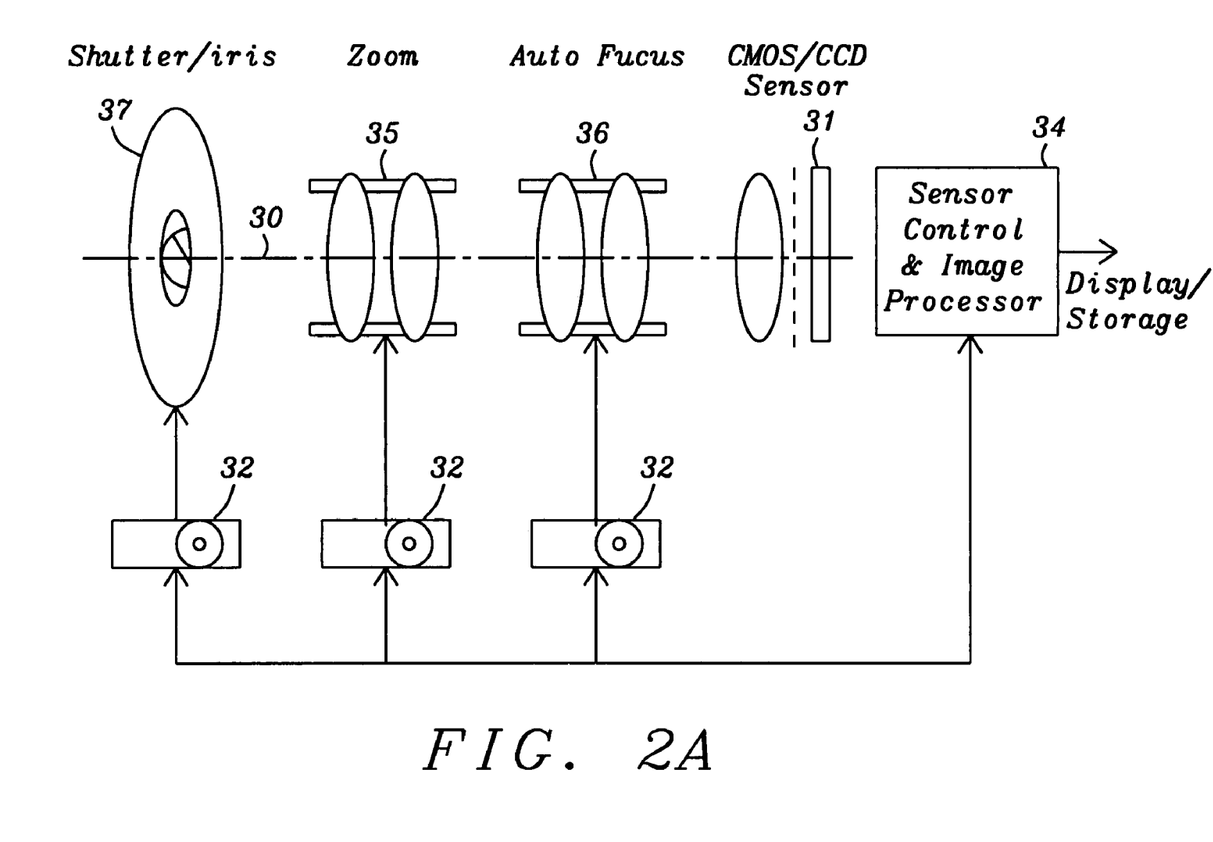
FIG. 2A is a schematic diagram of a digital camera unit of the present invention.

In FIG. 2A is a schematic diagram of a digital camera unit of the present invention. A series of lens, comprising zoom 35 and focus 36, are centered on an optical axis 30 to focus an image onto an image sensor 31, which comprises a CCD (charge coupled device) or a CMOS image sensor. An actuator 32, comprising a horological stepper motor, is controlled by CMOS I/O signals connected from the sensor control and image processor circuitry 34. The actuator 32 controls the movement of moveable lens elements forming zoom 35 and AF (auto focus) 36 where at least one lens is moveable in each of the moveable lens elements. In the digital camera units having a shutter or iris, the actuator 32 is used to control the shutter and iris function 37.

The horological stepper motor contained within the actuator 32 uses approximately an order of magnitude less current at approximately one and one half times lower voltage, resulting in approximately thirty times lower power dissipation than that is found in motors typically used in digital camera units, which perform similar functions. The maximum switch-on current of the horological motor of the present invention is less than approximately 8 ma with an average current of approximately 5 ma. The reduction in the power requirements not only reduces the drain on batteries but also allows the actuators 32 to be driven from standard CMOS I/O signals from within the sensor control and image processing circuitry 34, which leads to the capability of creating a system-on-chip that comprises the image sensor array, control circuitry, image processing circuitry and the CMOS I/O to drive the actuators.

There are no position sensors required in the present invention to perform the zoom and AF functions since the gear transmission ratio is chosen to be 1/180. The gear transmission system contained within the actuator 32 permits the horological step motor contained within the actuator to be driven is short steps in the range of micrometers, which in turn allows the horological step motor to move to a mechanical barrier and therefore, providing the capability to calibrate the position of the stepper motor.

Figure 2B:
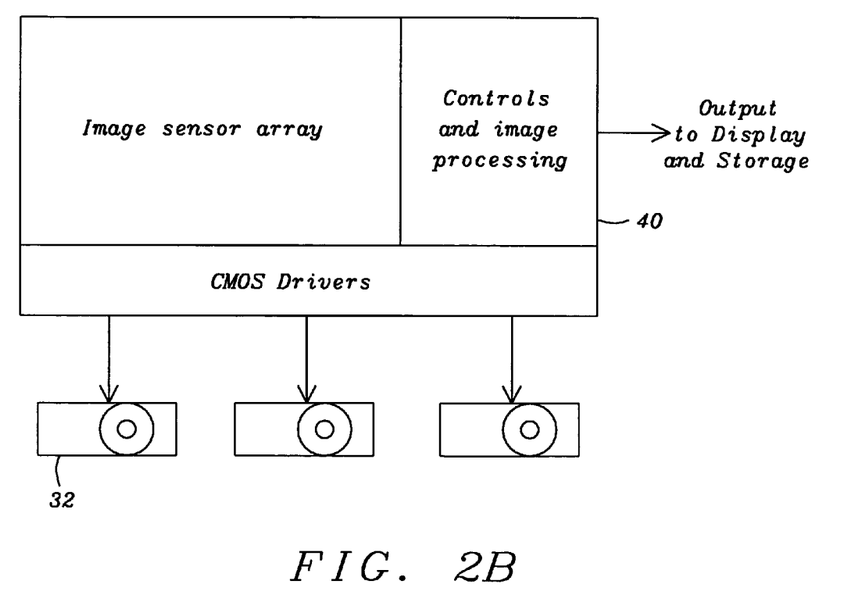
FIG. 2B is a block diagram of a system-on-chip implementation of the present invention.

FIG. 2B shows a block diagram of the present invention where the electronic circuits required to operate a digital camera unit are integrated into a single system-on-chip (SOC) 40. An image sensor array, control and image processing circuitry are integrated together along with the standard CMOS I/O drivers needed to provide control signals to the actuators 32. The SOC integration is made possible by the elimination of the need to have high power drivers for the motors previously used to adjust the position of camera lens and operate a shutter or iris. The SOC integration produces an improvement in reliability and a reduction in cost resulting from having fewer component parts.

Figure 3A:
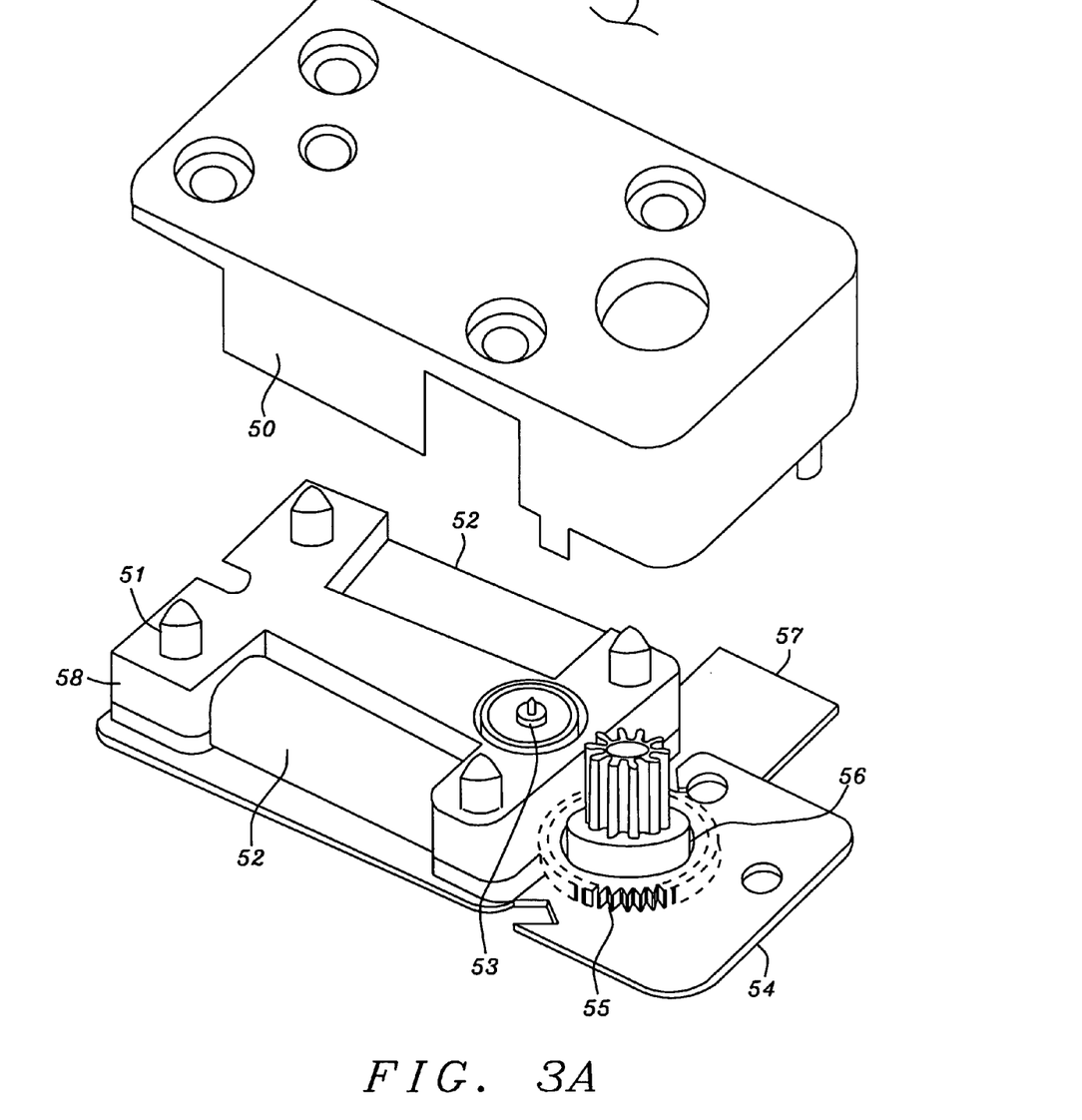
FIG. 3A is a diagram of the digital camera unit of the present invention.

In FIG. 3A is shown the actuator 32 of the present invention with the cap 50 removed from the assemblage of the actuator. The cap is joined to the assemblage of the actuator using the alignment posts 51 as guides. Two coils 52 of the stator are held in place horizontal to the base plate 54 by a stator core frame 58 mounted in the assemblage of the actuator using the alignment posts 51. A rotor 53 is secured in a hole formed within the stator core frame 58 and is driven by electrical signals to the coils 52 from CMOS I/O signals from the sensor control and image processing circuitry 34 (FIG. 2A). A gear 55 transfers torque from a rotor gear 60 (FIG. 3B) to the output drive shaft 56 comprising a gear like structure that interfaces a moveable lens element. The gear 55 and the output drive shaft 56 form a clutch arrangement (describe in FIG. 3C). A flexible printed circuit 57 connects electrical signals to the coils from the outside of the actuator.

Figure 3B:
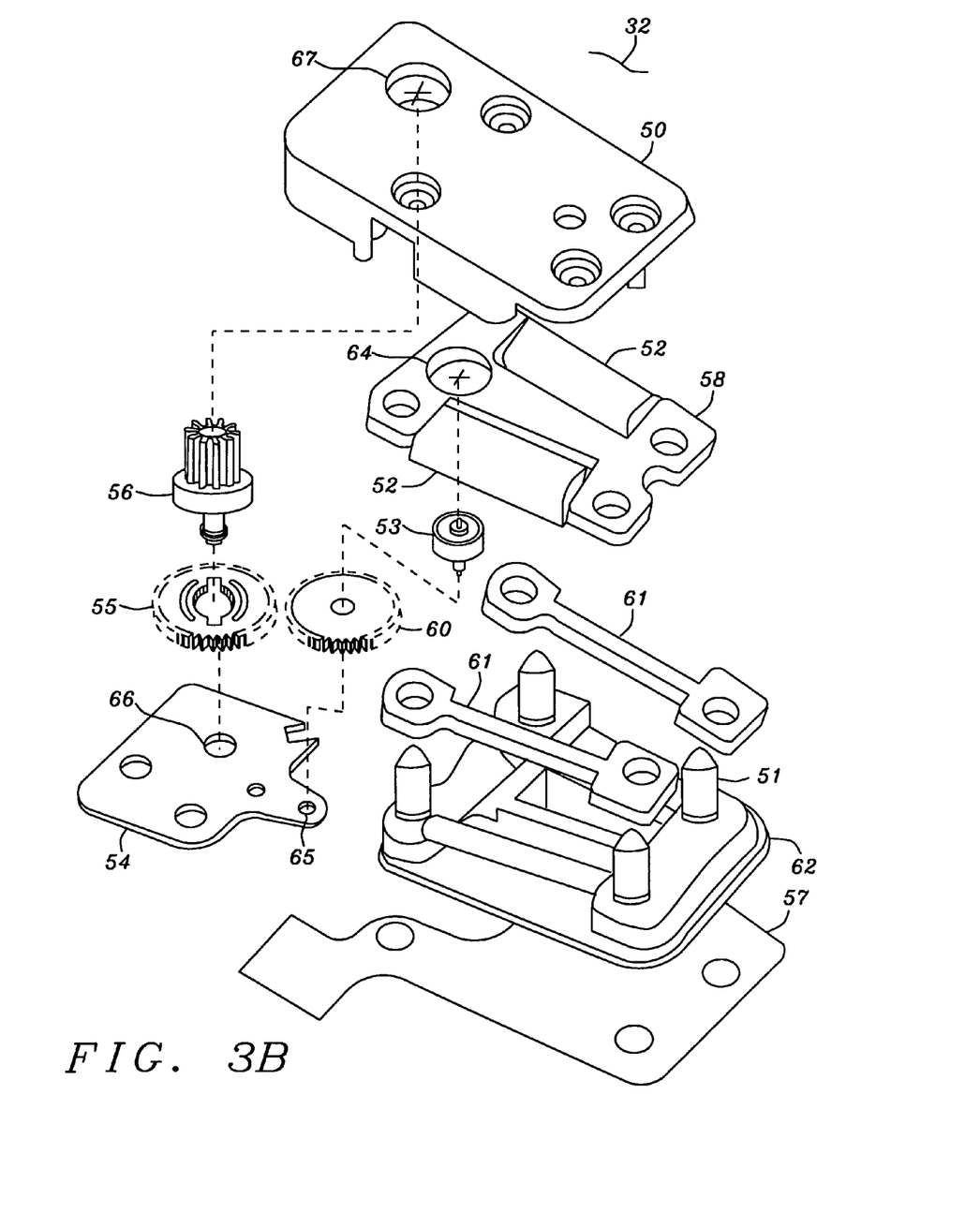
FIG. 3B is a diagram of the disassembled digital camera unit of the present invention.

FIG. 3B is a diagram of the disassembled digital camera unit 32 of the present invention. A base structure 62 contains four alignment posts 51 and clearance cavities for other parts of the assembly. Two spacer elements 61 are position on the alignment post 51 over which the frame of the stator 58 is assembled onto the alignment posts 51. The stator frame 58 contains a hole 64 into which the rotor 53 of the horological stepper motor is inserted and holds in position two electrical coils 52 located to either side of the stator alignment hole 64 parallel to the base plate of the actuator. The rotor 53 is magnetized in a radial orientation to produce rotation when the coils 52 are energized with a current from CMOS I/O drivers.

A rotor gear 60 of the horological stepper motor is held in position by a shaft protruding from the rotor structure, which is delimited by a hole 65 in the base plate 54. The stator, comprising the stator frame 58 and the two coils 52, holds the rotor 53 in at least one neutral position when phases of the stator are not energized. The rotor 53 is moved in minute steps in the range of micrometers whereby the torque of the rotor gear 60 turns gear 55 and output drive shaft 56 of the gear system to affect movement in the lens assembly comprising zoom, focus, shutter and iris.

The gear system of the present invention comprises a rotor gear 60, a gear 55 and a gear forming a part of the output drive shaft 56, which cooperates with a moveable optical element 35, 36 or 37 (FIG. 2A) to transmit movement from the rotor 53 of the horological stepper motor to the optical element. The output drive shaft 56 is positioned between hole 66 in the base plate 54 and hole 67 in the actuator cap 50. The gear 55 is positioned along the axis of the output drive shaft and engages gear teeth formed under the shoulder of the output drive shaft, shown in FIG. 3C, which forms a clutch arrangement. The clutch arrangement provides a capability to release the gear system by allowing the output drive shaft to be disengaged from the gear 55 and to allow the gear system freedom to turn to reduce the risk of damage to the gears when the device containing the digital camera unit is dropped or suffers other environmental shock conditions. After an environmental event where the gears have been disengaged, a simple algorithm allows repositioning of the actuators to a default position.

Figure 3C:
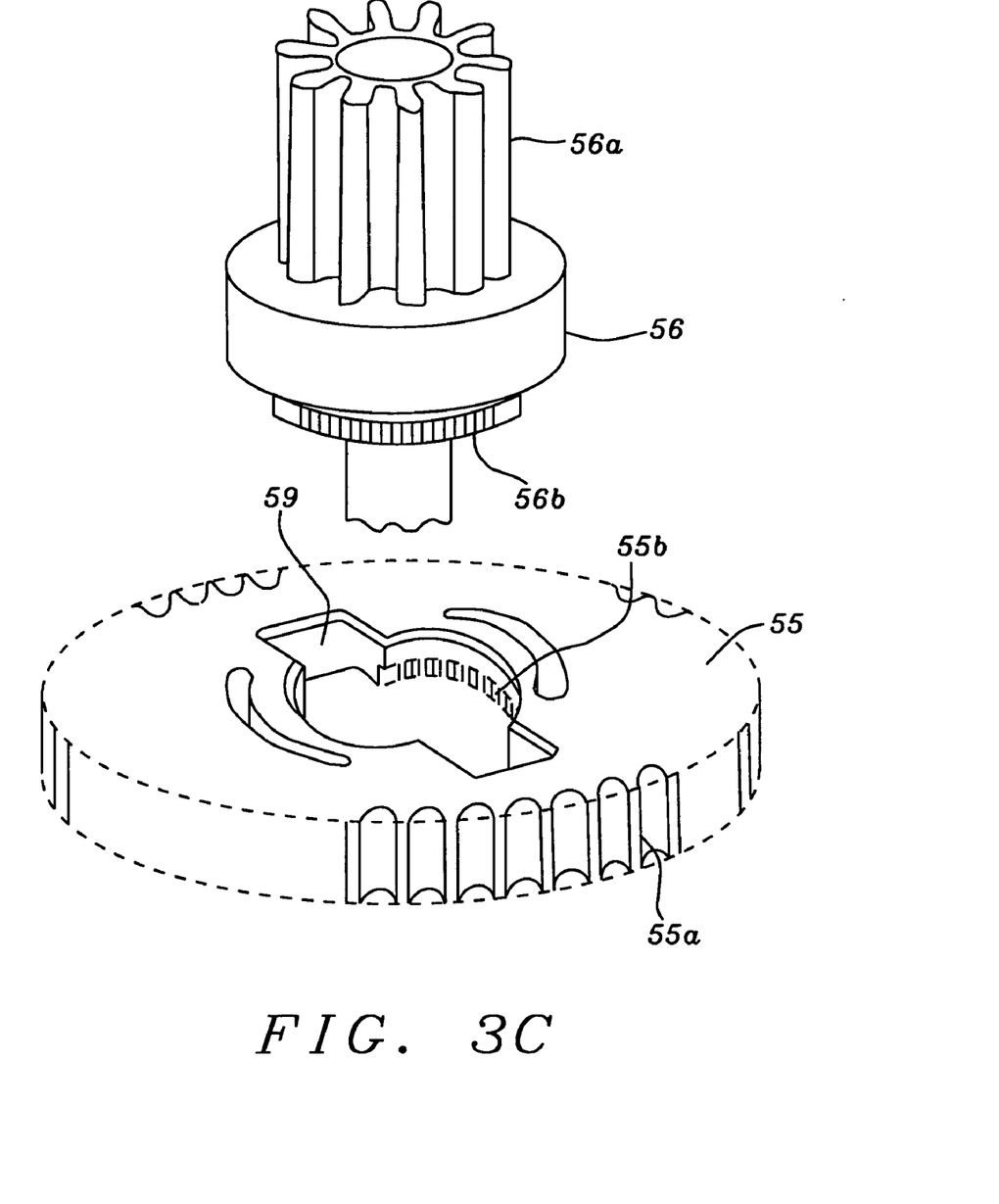
FIG. 3C is a diagram of clutch used in the digital camera unit of the present invention.

In FIG. 3C is shown a diagram of the clutch used in the digital camera unit of the present invention. Gear 55 engages the rotor gear 60 of the horological motor with gear teeth 55*a* and contains an opening 59 into which the output drive shaft 56 is disposed. Within the opening 59 is a first set of teeth 55*b* that engage a second set of teeth 56*b* located on the output drive shaft. When the first and second set of teeth are engaged, the motion of the rotor 53 (FIG. 3B) is transferred to the output drive shaft 56. The output drive shaft 56 transfers the motion of the rotor 53 to the optical element being driven with the gear structure 56*a* located at one end of the output drive shaft 56.

When an environmental event resulting to a shock force to be imparted upon the gear system of the digital camera unit, the teeth 55*b* and 56*b* become disengaged allowing the gears of the digital camera unit to be freed of mechanical constraint and allow the gear system to be neutral to any mechanical force imposed between the optical elements and the horological motor. Under this condition the lens packets may move and loose their current position; therefore, a calibration cycle is used after such a shock condition. The calibration is performed by moving the lens packets to known end positions, designed as mechanical stops, and then the lens packets are moved in a controlled manner back to the position prior to the shock event or by the demand of the user.

Figure 4:
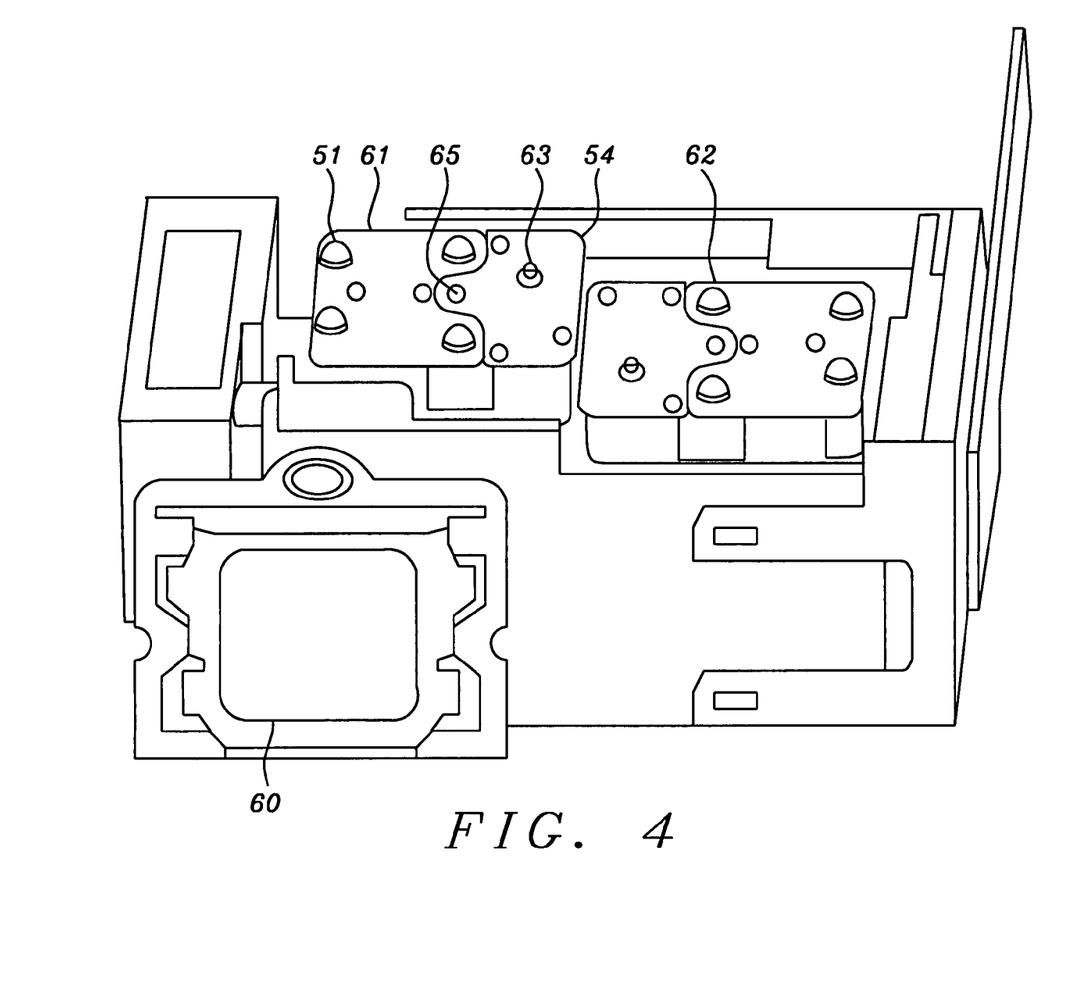
FIG. 4 is a diagram of a compact digital camera module of the present invention.

In FIG. 4 is shown a diagram of a compact digital camera module of the present invention. The first lens 60 performs the light entrance to the optics and through the optical system the light to the light sensor. A first actuator 61 and a second actuator 62 are shown assembled into the digital camera module face down where the gear on the output drive shaft 56 is engaged with an optical element (not shown). An end 63 of the output drive shaft 56, opposite the output drive shaft gear, is shown protruding through the base plate 54 of the actuator. Hole 65 located in the base plate 54 is the hole that delimits the shaft of the rotor 53. Also shown are the alignment pins 51 that are used to align the assemblage of the actuators 61 and 62.

Figure 5:
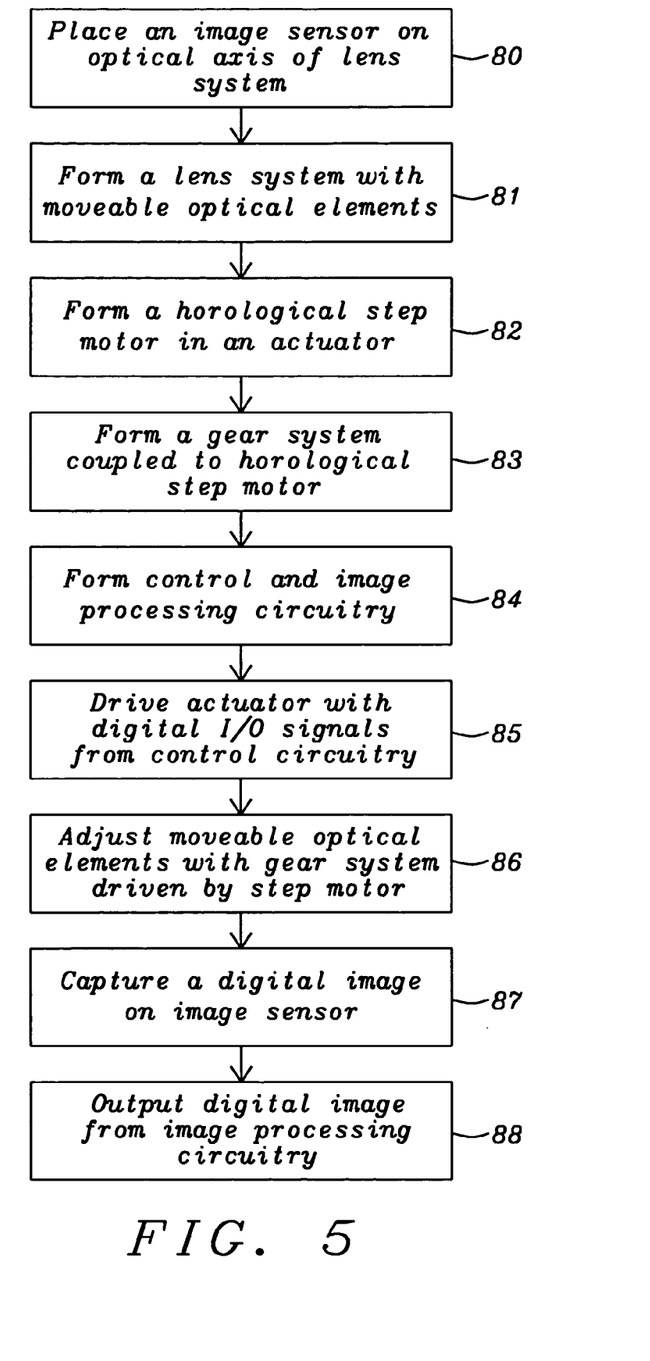
FIG. 5 is a method of the present invention for forming a digital camera module.

FIG. 5 shows a method of the present invention for forming a digital camera module. An image sensor is placed at the end of an optical axis of a lens system 80, and the image sensor is centered on the optical axis. The lens system is formed with moveable optical elements 81, comprising zoom, auto focus, shutter and iris, to allow adjustment of the optical elements. An electrical horological step motor is formed as an integral part of an actuator 82 to provide a capability of the actuator to create a torque necessary to adjust the optical elements. The electrical horological stepper motor is formed with a stator and a rotor. The stator contains a core bearing electrical coils which are oriented parallel with a base plate of the actuator containing the stepper motor. The electrical coils are driven by CMOS I/O signals, which cause the rotor to turn. The rotor is magnetized in a radial fashion, and the rotor is held in at least one fixed neutral position when phases of the stator are not energized. A delimiting hole is formed in the base plate into which the rotor is arranged.

Continuing to refer to FIG. 5, a gear system is formed within the actuator coupled to the electrical horological step motor 83 to transfer the torque of the step motor to an output drive shaft to produce movement in the moveable optical elements. The gear system contains an integrated clutch that disengages the gear system such that the gears are free to turn in the advent of an environmental event such as a mechanical force from dropping the device containing the digital camera module containing the actuator. Control and image processing circuitry are formed 84 to control the moveable optical elements, to capture of an image with the image sensor and to process the digital image captured by the image sensor. The actuator is driven with electrical signal using CMOS I/O signals from the control circuitry 85. The ability to drive the actuator with standard CMOS I/O signals allows the electronics of the digital camera module to be integrated into a system-on-chip comprising the image sensor, control circuitry, image processing circuitry and the CMOS I/O drivers, which are coupled to the coils of the stator. The gear system of actuator adjusts the moveable optical elements 86 by transferring a stepped movement of the horological step motor to the optical elements through the gear system of the actuator. A digital image is captured by the image sensor 87 after the adjustment of the optical elements have been satisfactorily adjusted, and the digital image is outputted from image processing circuitry 88 to a display or storage.

While the invention has been particularly shown and described with reference to preferred embodiments thereof, it will be understood by those skilled in the art that various changes in form and details may be made without departing from the spirit and scope of the invention.

What is claimed is:

1. A digital camera module, comprising:
    a) an optical lens assembly with an optical axis contained within a compact digital camera unit, wherein said optical lens assembly comprises at least one moveable optical element, whereby a focal length of said optical lens assembly is adjusted to project an image onto an image sensor;
    b) a driver unit comprising at least one actuator, wherein said actuator further comprises a Lavet type stepper motor and a gear system, whereby current applied to said stepper motor only when taking a step;

c) a control unit electrically connected to said actuator, wherein said actuator controlled by the control unit using CMOS digital I/O signals, whereby circuitry required to operate the digital camera integrated into a system-on-chip (SOC), wherein the SOC comprises:
   i) said image sensor;
   ii) control unit circuitry;
   iii) image processing circuitry;
   iv) CMOS digital I/O drivers; and
d) said actuator controlled to adjust said moveable optical element to produce a focused image onto said image sensor of said compact digital camera unit, wherein an integrated clutch formed by two gears of said gear system in which the two gears disengage upon an environmental situation, comprising mechanical shock, to relieve forces in the gear system and prevent damage, where after the location of the optical lens assembly calibrated by moving to an stop at end of allowed lens movement and then return to the optical lens assembly setting prior to the environmental situation.

2. The digital camera module of claim 1, wherein said stepper motor further comprises a rotor and a stator wherein said rotor is radially magnetized and said stator magnetically holds the rotor in at least one fixed neutral position when phases of the stator are not energized.

3. The digital camera module of claim 2, wherein said stator further comprises:
   a) a base plate delimiting hole in which the rotor is arranged;
   b) a core bearing coil; and
   c) said coil oriented parallel to said base plate.

4. The digital camera of claim 1, wherein said drive unit further comprises an output drive shaft in which said output drive shaft cooperates with the moveable optical element for transmission of movement whereby torque of the rotor is transmitted to the output drive shaft through said gear system.

5. The digital camera module of claim 1, wherein said moveable optical element comprises at least one lens.

6. The digital camera module of claim 1, wherein said compact digital camera unit used in portable electronic apparatus, comprising one of the following:
   a) a mobile phone;
   b) a digital still camera;
   c) a portable digital assistant; and
   d) a camcorder.

7. The digital camera module of claim 1, wherein said image sensor is a light sensitive device formed from technologies comprising one of the following:
   a) a CCD (charge coupled device) image sensor; and
   b) a CMOS image sensor.

8. A method for forming a compact digital camera module, comprising:
   a) forming an adjustable lens system for a digital camera, comprising;
      i) at least one moveable optical element moveable along an optical axis;
      ii) an actuator comprising a Lavet type electrical step motor;
      iii) a gear system coupling said step motor to said optical element;
      iv) a control circuit and an image processing circuit;
   b) forming an integrated clutch within said gear system comprising two gears that disengage to free forces in the gear system when the digital camera experiences an environmental situation such as mechanical shock;
   c) calibrating said adjustable lens system after said environmental situation by a movement of the moveable optical element to known end adjustment position, and then return to a position prior to the environmental situation;
   d) driving said actuator with CMOS digital I/O signals from said control circuitry;
   e) adjusting said moveable optical element along said optical axis with said gear system driven by said electrical step motor; and
   f) outputting a digital image from said image processing circuitry.

9. The method of claim 8, wherein forming said electrical step motor further comprises:
   a) forming a stator;
   b) forming a rotor;
   c) magnetizing said rotor in a radial orientation; and
   d) holding the rotor magnetically in at least one fixed neutral position when phases of the stator are not energized.

10. The method of claim 9, wherein forming said stator further comprises:
    a) forming a limiting hole in a base plate into which said rotor is arranged;
    b) forming a core bearing a coil; and
    c) positioning said coil parallel to said base plate.

11. The method of claim 8, wherein forming control circuitry and image processing circuitry further comprises integration of said image sensor with said control circuitry and image processing circuitry into a single semiconductor chip and thereby forming a system-on-chip.

12. A compact digital camera module, comprising:
    a) a means for adjusting focus and zoom of an optical lens assembly;
    b) a means for controlling said focus and zoom with an actuator comprising a Lavet type stepper motor, wherein said stepper motor mounted in a fixed location external to said optical lens system assembly;
    c) a means for providing torque from said Lavet type stepper motor through a gear system containing an integrated clutch, whereby said integrated clutch formed by two gears of said gear system to allow a release of forces within the gear system to avoid damage to the gear system from an environmental situation comprising mechanical shock;
    d) a means for calibration of the optical lens assembly after the environmental situation by a movement of the optical lens to known end adjustment position, and then return to a position prior to the environmental situation; and
    e) a means for controlling said Lavet type stepper motor with CMOS digital I/O signals from control circuitry.

13. The compact digital camera module of claim 12, wherein said means for adjusting focus and zoom comprises moveable optical elements along an optical axis wherein the moveable optical elements contain at least one lens.

14. The compact digital camera module of claim 12, wherein said Lavet type stepper motor further comprises:
    a) a stator; and
    b) a rotor magnetized in a radial manner and held in position magnetically by said stator in at least one fixed neutral position when phases of the stator are not energized.

15. The compact digital camera module of claim 12, wherein the means for controlling said Lavet type stepper motor with said CMOS digital I/O signals allows a system-on-chip integration comprising said control circuitry, motor drive circuitry, image processing circuitry and an image sensor.

* * * * *